United States Patent
Lutz (10) Patent No.: US 10,845,790 B2
(45) Date of Patent: Nov. 24, 2020

(54) OPERATOR SYSTEM AND METHOD FOR OPERATING AND OBSERVING A TECHNICAL PLANT TO BE CONTROLLED

(71) Applicant: Siemens Aktiengesellschaft, Munich (DE)

(72) Inventor: Benjamin Lutz, Pfinztal (DE)

(73) Assignee: Siemens Aktiengesellschaft, Munich (DE)

( * ) Notice: Subject to any disclaimer, the term of this patent is extended or adjusted under 35 U.S.C. 154(b) by 170 days.

(21) Appl. No.: 16/209,342

(22) Filed: Dec. 4, 2018

(65) Prior Publication Data

US 2019/0171196 A1 Jun. 6, 2019

(30) Foreign Application Priority Data

Dec. 5, 2017 (EP) .................................. 17205492

(51) Int. Cl.
*G05B 23/02* (2006.01)
(52) U.S. Cl.
CPC ....... *G05B 23/0216* (2013.01); *G05B 23/027* (2013.01); *G05B 23/0267* (2013.01); *G05B 23/0272* (2013.01)
(58) Field of Classification Search
CPC ............ G05B 23/0216; G05B 23/0267; G05B 23/027; G05B 23/0272
USPC ........................................................ 700/83
See application file for complete search history.

(56) References Cited

U.S. PATENT DOCUMENTS

| | | | |
|---|---|---|---|
| 2005/0027377 A1* | 2/2005 | Lucas | G05B 19/41845 700/28 |
| 2009/0293010 A1 | 11/2009 | Rock | |
| 2014/0282195 A1* | 9/2014 | Nixon | G05B 23/0216 715/771 |
| 2017/0205795 A1* | 7/2017 | Penumatcha | G05B 19/0428 |

FOREIGN PATENT DOCUMENTS

| | | |
|---|---|---|
| EP | 2124114 | 11/2009 |
| EP | 2808749 | 5/2013 |

OTHER PUBLICATIONS

Siemens Katalog Prozessleitsystem SIMATIC ST PCT 7, Edition 2007.

* cited by examiner

*Primary Examiner* — Michael J Brown
(74) *Attorney, Agent, or Firm* — Cozen O'Connor (57) ABSTRACT

A method for operating and observing a technical plant to be controlled, wherein block symbols for plant schematics can be generated which are structured, personalized, and assembled dynamically at runtime which, for example, enable an efficiently guided and assisted handling of alarm messages by an operator, where the dynamically updated display of alarm-producing process objects based on an equipment hierarchy enables an evaluation of items causing floods of alarms.

6 Claims, 6 Drawing Sheets

OPERATOR SYSTEM AND METHOD FOR OPERATING AND OBSERVING A TECHNICAL PLANT TO BE CONTROLLED

BACKGROUND OF THE INVENTION

1. Field of the Invention

The invention relates to a method for operating and observing a technical plant to be controlled and to an operator system for implementing the method.

2. Description of the Related Art

In process control engineering, there are usually hundreds of plant schematics and several thousand process objects to manage, where a process object has multiple facets that belong together. For example, a process map of a server in an operator system comprises process map modules belonging to those process objects, or respectively process data of relevance in operational and monitoring respects for those process objects, an automation device comprises automation modules belonging to the process objects or respectively control modules (CFCs, SFCs, etc.), and furthermore a user interface of a client of the operator system comprises block symbols belonging to the process objects in a plant schematic, and also so-called faceplates, where the plant schematics, which each comprise graphical image symbols and also the block symbols of the process objects, are provided for process monitoring, and the faceplates for process management or respectively process operation.

The process objects of a technical plant which needs to be controlled, e.g., process objects in the form of measuring points, tanks, valves, sensors, or actuators, and also Continuous Function Charts (CFCs) and Sequential Function Charts (SFCs), are usually structured in a so-called equipment hierarchy (EQH), where a user creates this equipment hierarchy initially by using a suitable software facility of an engineering system. The equipment hierarchy created in this way is then compiled using the engineering system and loaded at least in to one operator server of one operator system of one process control system (compile & download), where the equipment hierarchy is used as a central launching point, e.g., for a batch process, or for navigating or respectively for identifying a process object within the equipment hierarchy at runtime of the operator systems and the automation devices, or respectively at runtime of the process control system. Alongside nodes representing plant schematics, the equipment hierarchy has further nodes that represent the process objects. By selecting or respectively clicking on a plant schematic node, on the one hand, an operator can open the corresponding plant schematic for visualization on a display unit, and by selecting or respectively clicking on a process object node, on the other hand, open a faceplate belonging to that process object, resulting in the operator being able to operate the process object and therefore the plant. This faceplate can also be opened by the method of the operator selecting or respectively clicking on a block symbol belonging to that process object in the plant schematic.

To put in place safe and efficient operation and observation of a technical process plant, an alarm management facility providing guidance and assistance for an operator is an important factor. In case of alarms occurring, particularly in cases of a "flood of alarms", it is desirable for the operator, in the context of process management, to find the respective causes, derive procedures for canceling the alarms, and cancel alarms without "detours", with a small number of inputs or respectively "clicks". In case of canceling multiple alarms in sequence in particular, it is important that the operator does not have to repeat the same "procedure" of selecting the alarm to be canceled, localizing and classifying it, and canceling it, in the case of every alarm.

So-called message sequence displays are known from the Siemens catalog "ST PCS 7", section 7, 2017 edition, by which messages, e.g., diagnostic, warning and/or alarm messages, can indeed be sorted in a tabular manner for handling in accordance with different attributes, although this tabular display results in the underlying plant structure being lost with regard to a sequence evaluation and it is firstly necessary to navigate to the alarm-producing process object again for the purpose of canceling, for example, every alarm message or respectively every alarm.

SUMMARY OF THE INVENTION

In view of the foregoing, it is therefore an object of the invention to provide a method via which the operation and observation of a technical plant to be controlled is simplified, in particular in the case of process malfunctions, and to provide an operator system that which is suitable for performing the method.

These and other objects and advantages are achieved in accordance with the invention by a method and operator system, wherein it is advantageous if block symbols for plant schematics are generated which are structured, personalized, and assembled dynamically at runtime which, for example, enable an efficiently guided and assisted handling of alarm messages by an operator. Moreover, a dynamically updated display of alarm-producing process objects according to an equipment hierarchy enables an evaluation of items causing floods of alarms.

In an embodiment of the invention, the operator can better assess the status or respectively risk situation with reference to the technical processing plant if the quantity of displayed block symbols in the plant schematics "shrinks" or "grows". For example, a growing quantity indicates increasing malfunctions and therefore multiple process objects to be handled. A shrinking quantity, on the other hand, indicates few malfunctions and therefore few process objects to be dealt with. In the event that no more block symbols are displayed, there are no longer any active messages, alarms or respectively alarm messages of process objects present for the operator which would have to be handled according to his/her access rights. This type of dynamic display of the block symbols in plant schematics results in the quantity of alarms being immediately "graspable" for the operator with authorized access, where the trend toward fewer or more alarms can also be discerned directly through the quantity of displayed block symbols in the plant schematics shrinking or growing.

In a further embodiment of the invention, further symbols, e.g., symbols in the form of horizontal and/or vertical arrows, which point to removed block symbols, are displayed in the plant schematic, in addition to the displayed block symbols. This results in the "compression" of the block symbols being displayed to the operator.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The invention, its embodiments, and also advantages are explained in detail below based on the drawings, exemplary embodiments of the invention being illustrated, in which.

DETAILED DESCRIPTION OF THE EXEMPLARY EMBODIMENTS

Identical parts shown in FIGS. 1 to 5 are labeled with the same reference characters.

Figure 1:
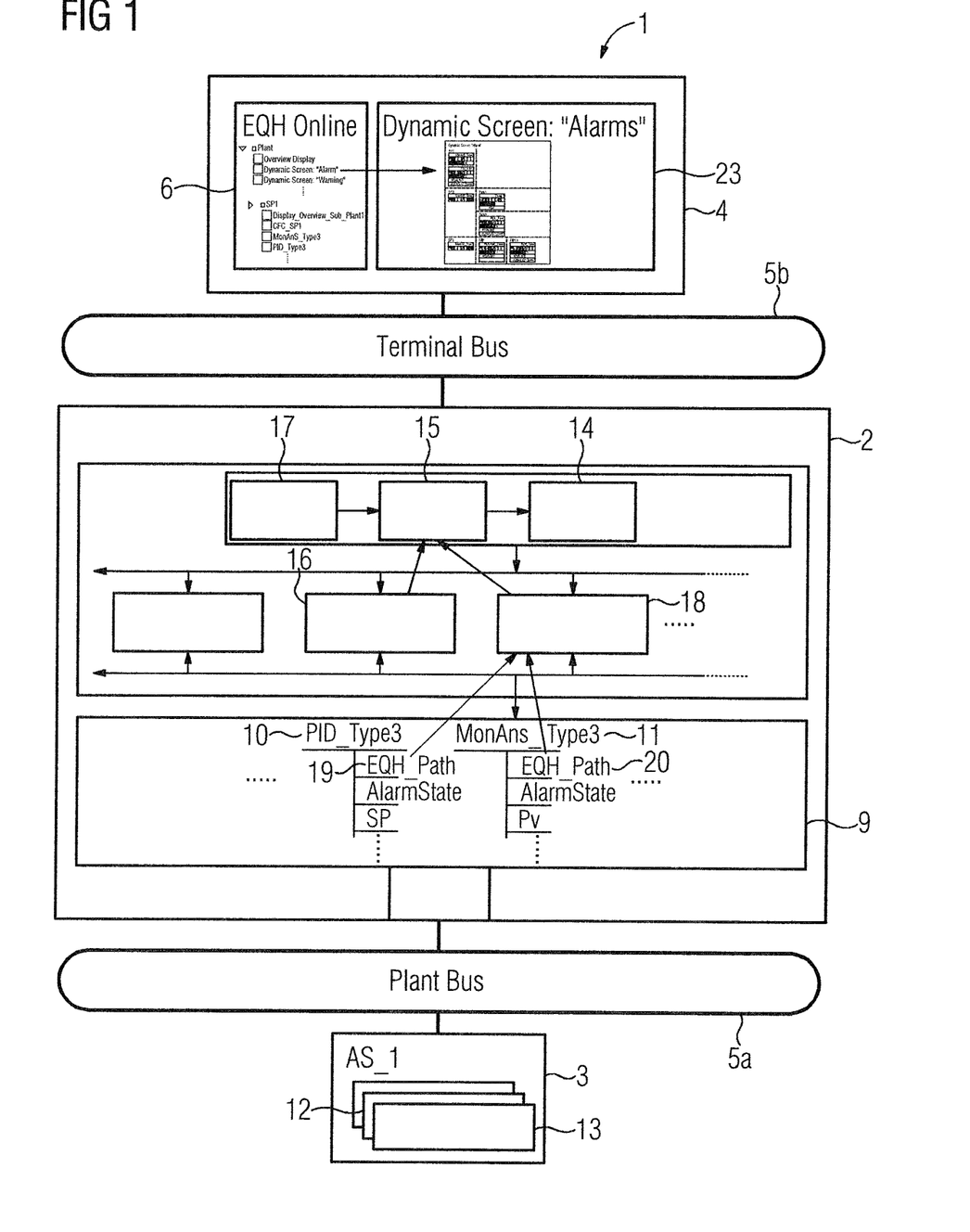
FIG. 1 is a schematic illustration of components of a process control system.

In FIG. 1, components of a process control system are designated by 1, which in the present exemplary embodiment comprise an operator server 2, an automation device 3, and an operator client 4. It should be understood the process control system can have a multiplicity of automation devices which, on the one hand, are linked to the operator server 2 via a plant bus 5a and, on the other hand are linked to local peripherals via a further bus not shown here, to which a multiplicity of field devices (sensors, actuators) are connected. In the present example, only one operator client 4 and one operator server 2 are shown. It should be understood further operator servers and further OS clients can be provided, furthermore, where it is usual for one operator server and one operator client linked to that server via a so-called terminal bus 5b to form an operator system or respectively an operator station in each case.

The operator client 4 is provided for displaying an equipment hierarchy and plant schematics, where (as explained) an equipment hierarchy not only has nodes that represent the plant schematics but also further nodes that represent the process objects. By selecting or respectively clicking on a plant schematic node, on the one hand, an operator can open the corresponding plant schematic for visualization on a display unit, and by selecting or respectively clicking on a process object node, on the other hand, open a faceplate belonging to that process object, resulting in the operator being able to operate the process object and therefore the plant. This faceplate can furthermore be opened by the operator selecting or respectively clicking on a block symbol belonging to that process object in the plant schematic.

Figure 2:
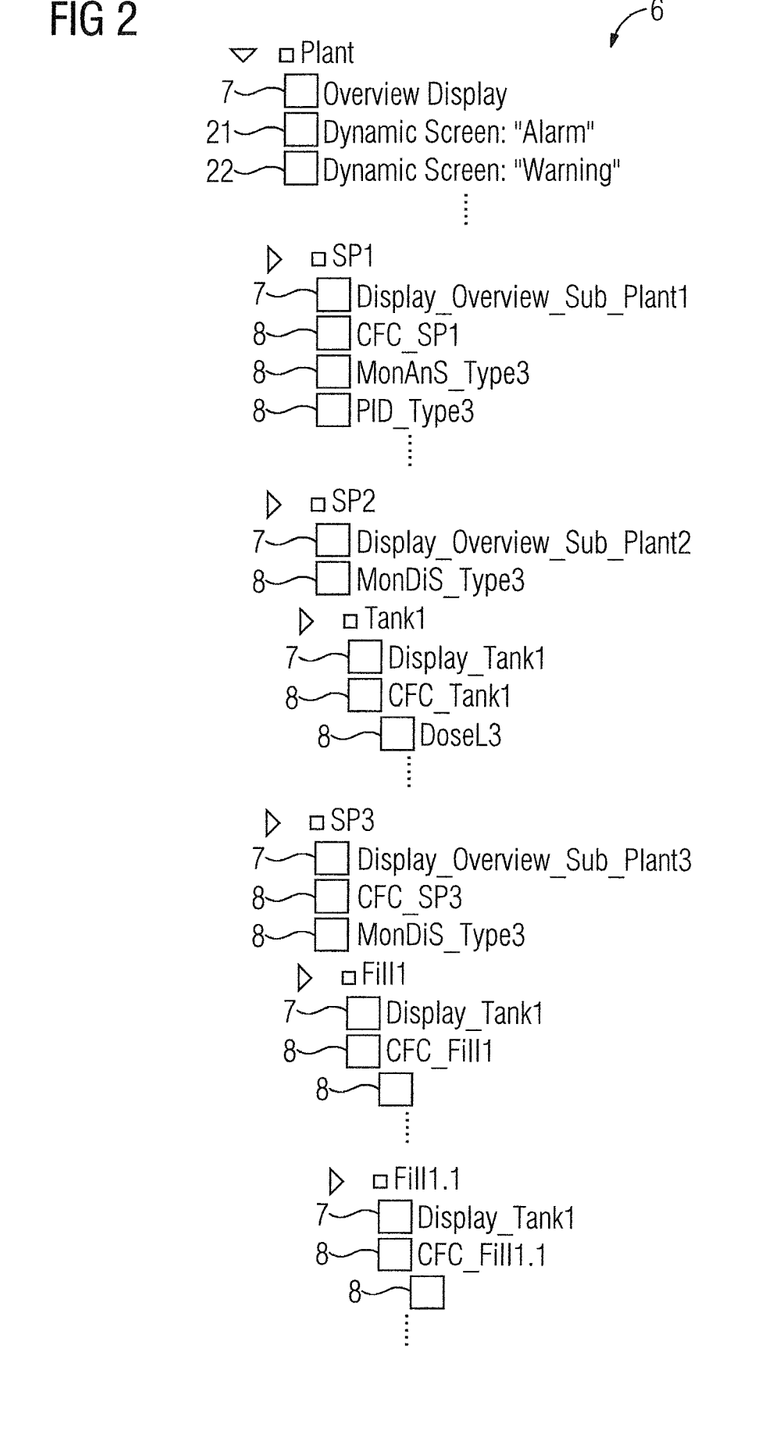
FIG. 2 is a schematic illustration of an equipment hierarchy in accordance with the invention.

With reference to FIG. 2, shown therein are components of a process control system, in which an equipment hierarchy (EQH) 6 is displayed. A user creates this equipment hierarchy 6 using a suitable software facility of an engineering system (not shown) of the process control system, where the equipment hierarchy 6 represents a technological view of a technical plant to be controlled. Nodes 7, 8 are entered or respectively stored in a structured manner in this equipment hierarchy 6 according to a tree structure, of which nodes 7 represent plant schematics, e.g., "Display_Overview_Sub_Plant1" or "Display_Tank1", and nodes 8 CFC charts and process objects, such as process objects in the form of monitoring and controller objects ("MonAns_Type3", or "PID_Type3").

Using the equipment hierarchy 6 created by the engineering system and loaded in to the operator system after compiling, the respective plant schematic can be opened online, i.e., during control of the process. To do this, an operator selects, e.g., via a "mouse", each corresponding plant schematic node 6 in each equipment hierarchy 6 displayed on the operator client 4, which results in the plant schematic belonging to the selected plant node being opened and displayed on the operator client 4. A plant schematic of this type usually contains graphical image symbols, such as for tanks, containers, valves, or pipes, and also block Symbols belonging to process objects, where the block symbols are provided for process monitoring to show current process values and parameters during control of the process.

With a view to process management the operator can influence process objects, for example, by changing the target value and/or further parameters, by initially selecting or respectively "clicking on" the displayed block symbols in the plant schematic. In the event that the operator selects a block symbol, a process object faceplate belonging to that block symbol, which is provided for process management but not shown here, opens up. This faceplate is displayed on the operator client 4, where the faceplate has corresponding fields for entering, changing, and/or deleting parameters of the process object.

It should be noted that the term "process object" is understood to mean the respective facets of a process object, which are stored in the operator system 2, 4, in a process map 9 of the operator server 2, and in the automation device 3. Thus, the process map 9 of the operator server 2 has, for example, process map modules 10, 11 belonging to process objects, the automation device 4 automation modules 12, 13 belonging to those process objects, and furthermore an interface 14 of the operator system faceplates and block symbols belonging to those process objects.

To simplify the operation and observation of a technical plant to be controlled, and in order to be able to make available plant schematics or parts of plant schematics of process objects generating a message, the schematics being structured in terms of the technical process, personalized, and assembled dynamically at runtime, the operator server 2 (FIG. 1) has a (software) component 15 that is configured to read out a message memory 16 in which the messages transmitted to the operator server 2 by the automation modules are stored. Based on this information, the component 15 detects which process objects generated or respectively caused a message, such as a message in the form of an alarm message, warning message, or diagnostic message.

The component 15 is further configured to read out an access memory 17 in which are stored the process objects in the equipment hierarchy 6 which an operator who is logged on to the operator system 2, 4 is allowed to have read and/or write access. These access rights are usually entered in the access memory 17 by using the engineering system during a planning phase. By using the information as to which process objects are generating a message and which process objects an operator who is logged on is allowed to access, the component 15 determines which of the process objects generating a message the operator who is logged on is allowed to have read and/or write access to in the equipment hierarchy 6.

The component 15 is moreover configured to read out, from a data memory 18, path names 19, 20 that are transmitted by the process map 9 in to the data memory 18. The path names 19, 20 each describe the path of a process object generating a message within the technological structure of the equipment hierarchy 6, where it is assumed in the present exemplary embodiment that these process object are realized in the form of a PID controller and in the form of a monitoring module.

As a result of the fact that, based on the path names, the component knows the path of those process objects within the equipment hierarchy, and has determined or respectively checked by this means whether the operator who is logged on is allowed to access those process objects at all, the component is pre-prepared to create a plant schematic that is structured in terms of the technical process and personalized to the operators, containing the block symbols of the process objects generating a message, in a need-oriented and dynamic manner. Need-oriented is to be understood to mean that the block symbols of a plant schematic are only created and updated if the operator who is logged on and has authorized access selects or respectively chooses a message node 21, 22 in the equipment hierarchy 6 at runtime, with the result that those block symbols are displayed on the operator client 4.

In the event that the operator who is logged on wishes to observe and operate process objects that generated a message in the form of an alarm, the operator selects the message node 21 ("Dynamic Screen: "Alarm"") in the equipment hierarchy 6 (FIG. 2). The structuring in terms of the technical process is (as described) derived from the path names of the alarm-producing (alarm-message-generating) process objects and corresponds to the technological hierarchy at runtime (EQH Online) shown in FIG. 2. In a dynamic plant schematic 23 (FIG. 3), only block symbols 24 to 31 of the process objects that are issuing alarms, and which are also allowed by the operator's access rights to be handled by that operator, are then displayed at runtime.

Figure 3:
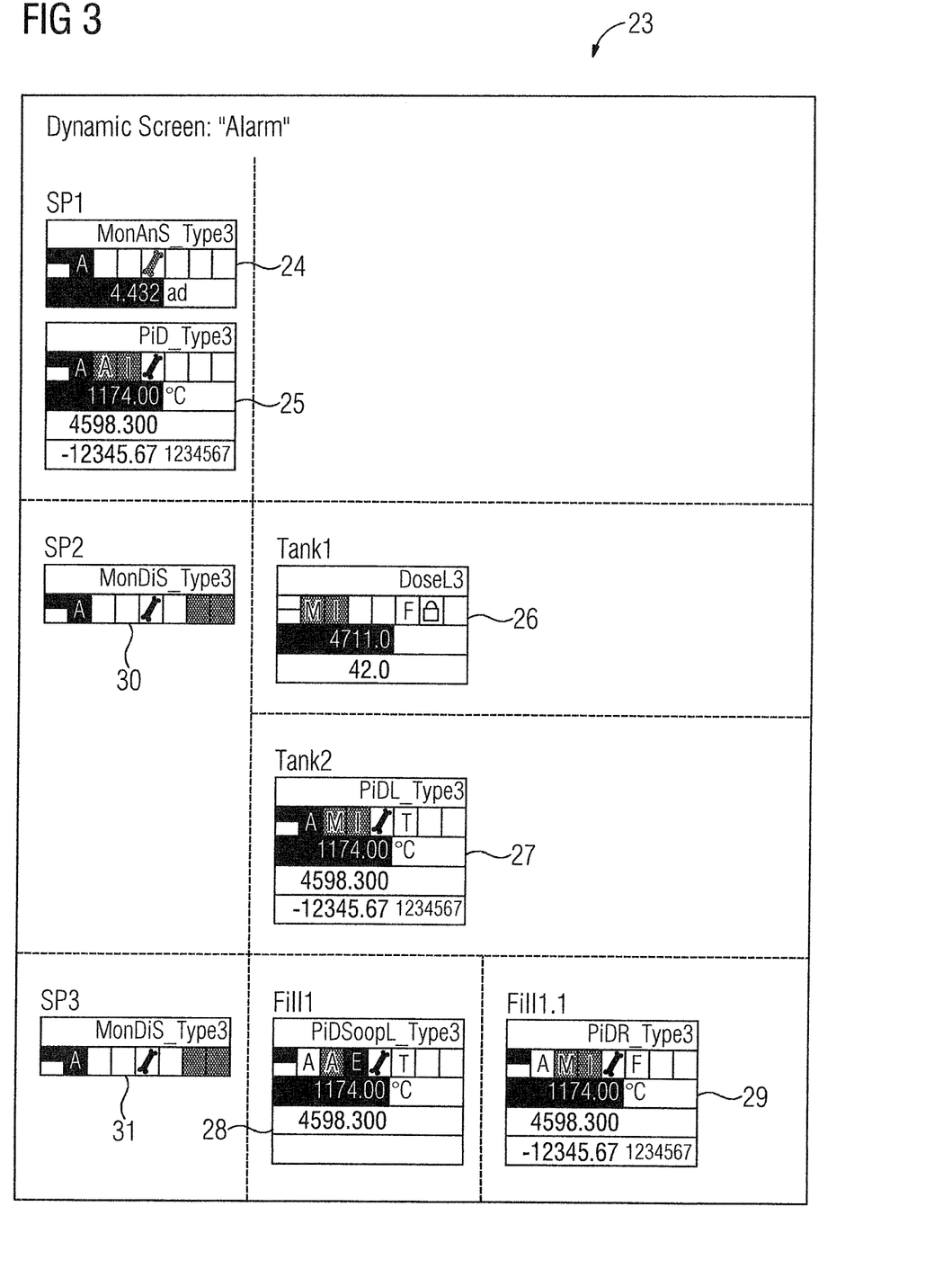
FIGS. 3 to 5 are illustrations of block symbols of a plant schematic in accordance with the invention.

In the event that the alarm-producing process objects are then operated by the operator, in that the operator firstly selects the associated block symbols and then manages the associated faceplates that open, the component 15 assembles the plant schematic 23 anew, by the component 15 removing the "operated" block symbols from the plant schematic 23 after operation.

Figure 4:
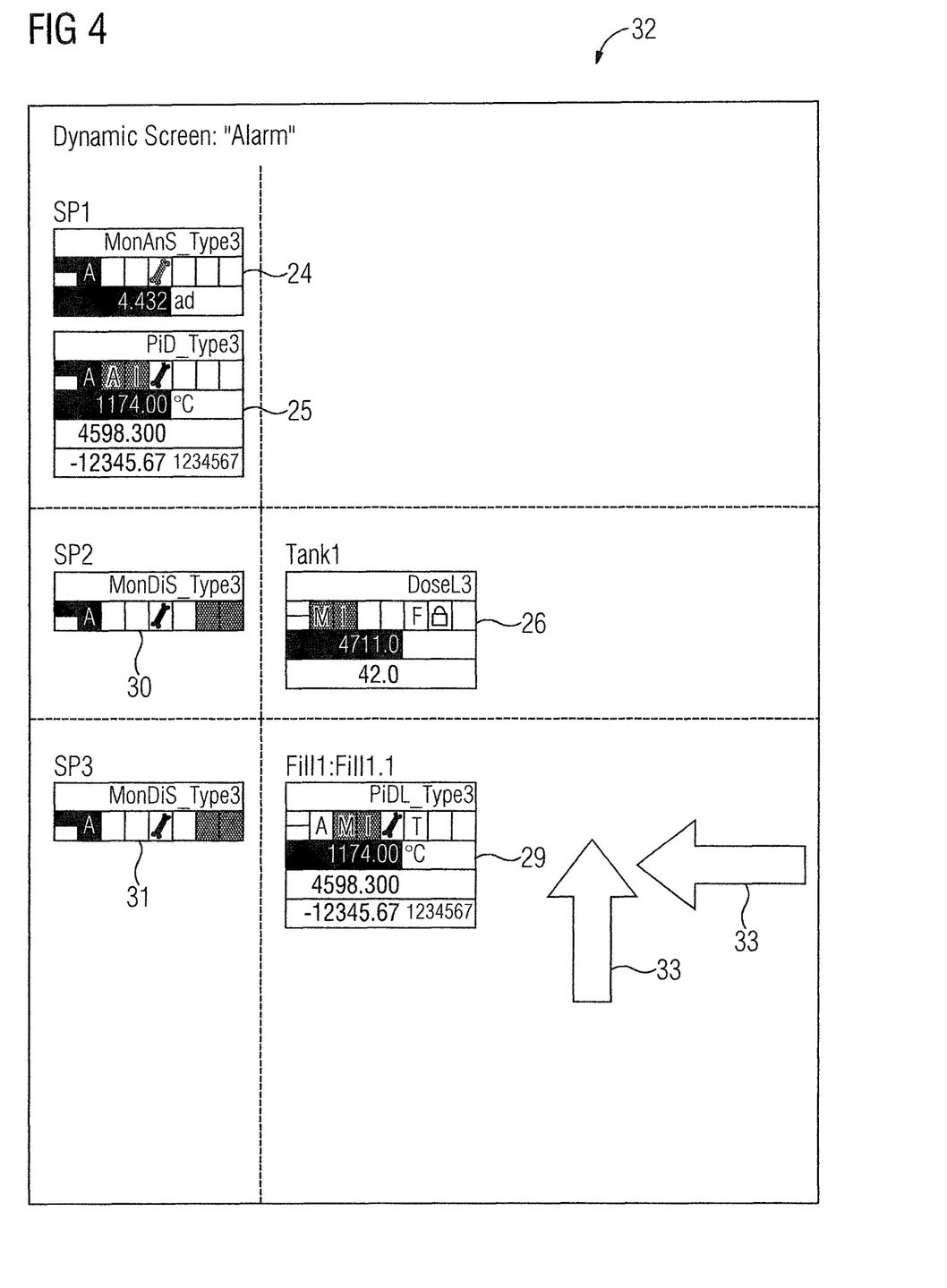
Figure 5:
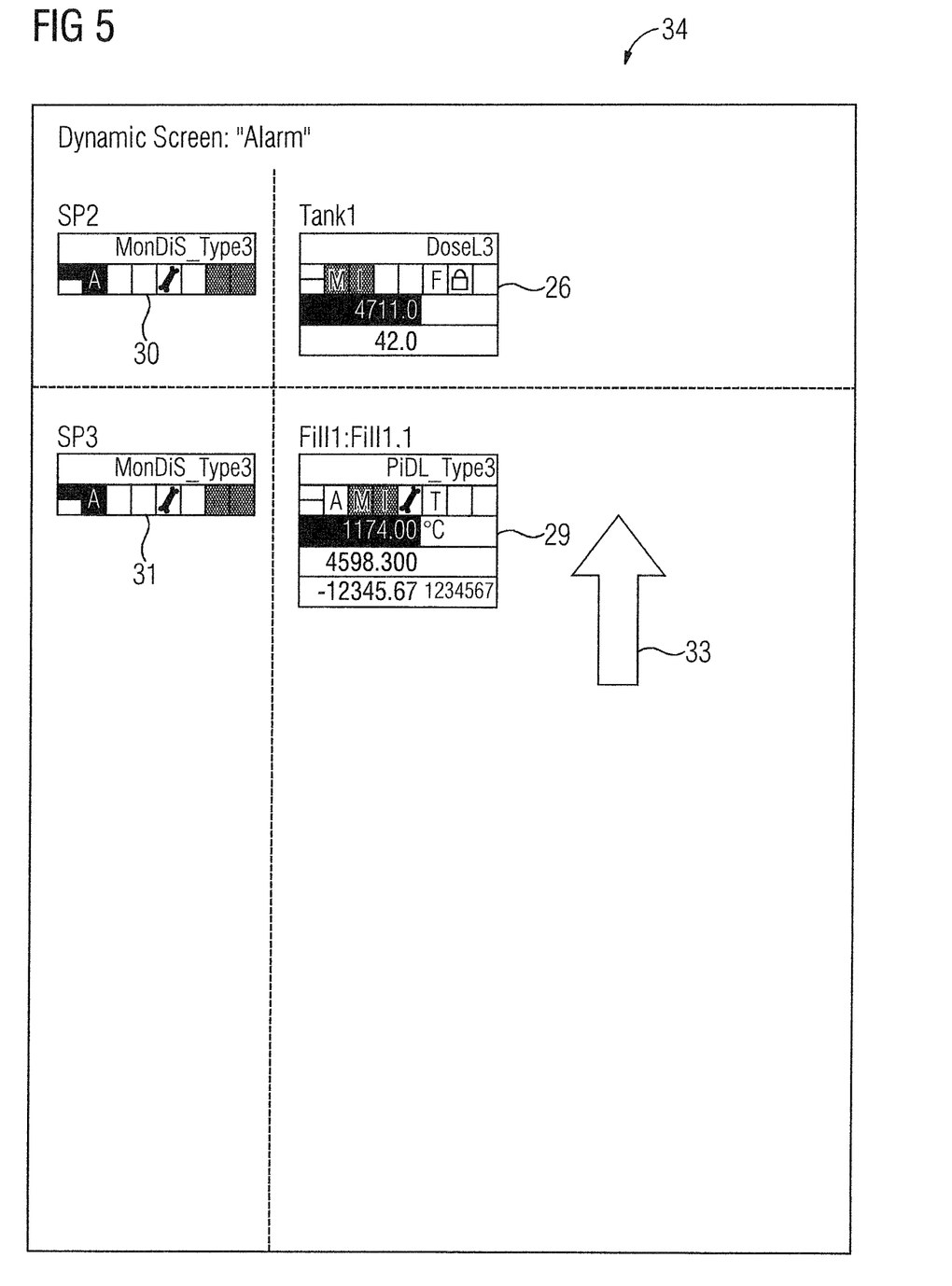

If, for example, the alarms of the displayed block symbols 27, 28 ("PIDL_Type3" from "Tank2" and "PICStopL_Type3" from "Fill1") of the alarm-producing process objects are handled, then the component 15 assembles the plant schematic anew (directly at runtime) and generates a "compressed" plant schematic 32 (FIG. 4). Furthermore, the component 15 generates further symbols in the form of horizontal and vertical arrows 33, which point to the removed block symbols 27, 28. This type of compression results in the EQH paths being correspondingly concatenated. The path of the process object or respectively the measuring point "Fill1.1" is concatenated to "Fill1.Fill1.1" under the technical facility "Fill1" so that the "EQH path" has no gaps (resulting from the compression) to the respective process object, which could be problematic with reference to localization of the process object. The compression results in all the block symbols moving "together" so that efficient alarm handling is supported without the operator having to perform a change of image for the purpose. If further alarms from the process objects are then handled, for example all alarms from the sub plant "SP1" (Sub Plant 1), then the plant schematic is again compressed dynamically at runtime (FIG. 5). Compressing the plant schematic has the effect that the block symbols 24, 25 are removed and a compressed plant schematic 34 is displayed.

If a displayed plant schematic has no more block symbols, then this indicates that there are no longer any further active alarms from process objects present for the operator, according to his/her access rights, which he/she would have to handle.

This type of dynamic display in the plant schematic results in the quantity of alarms being immediately "graspable". The trend toward fewer and more alarms can also be discerned directly through the plant schematic shrinking or growing. Advantageous for this dynamic display of active alarms is that, based on the visually structured display built on the equipment hierarchy, the operator can detect relationships between process objects and alarms and develop a strategy for alarm handling. Due to the concatenation of process objects, a flood of alarms is usually triggered by one of those process objects as the causative item. This dynamic and structured display, as described, makes it possible for the operator to detect and handle the source of a flood of alarms. Frequently, a high-priority alarm is not similarly the immediate cause of a flood of alarms so that canceling it likewise does not contribute to canceling the flood of alarms. Using the measures described creates the possibility of rapidly detecting the cause of a flood of alarms.

Figure 6:
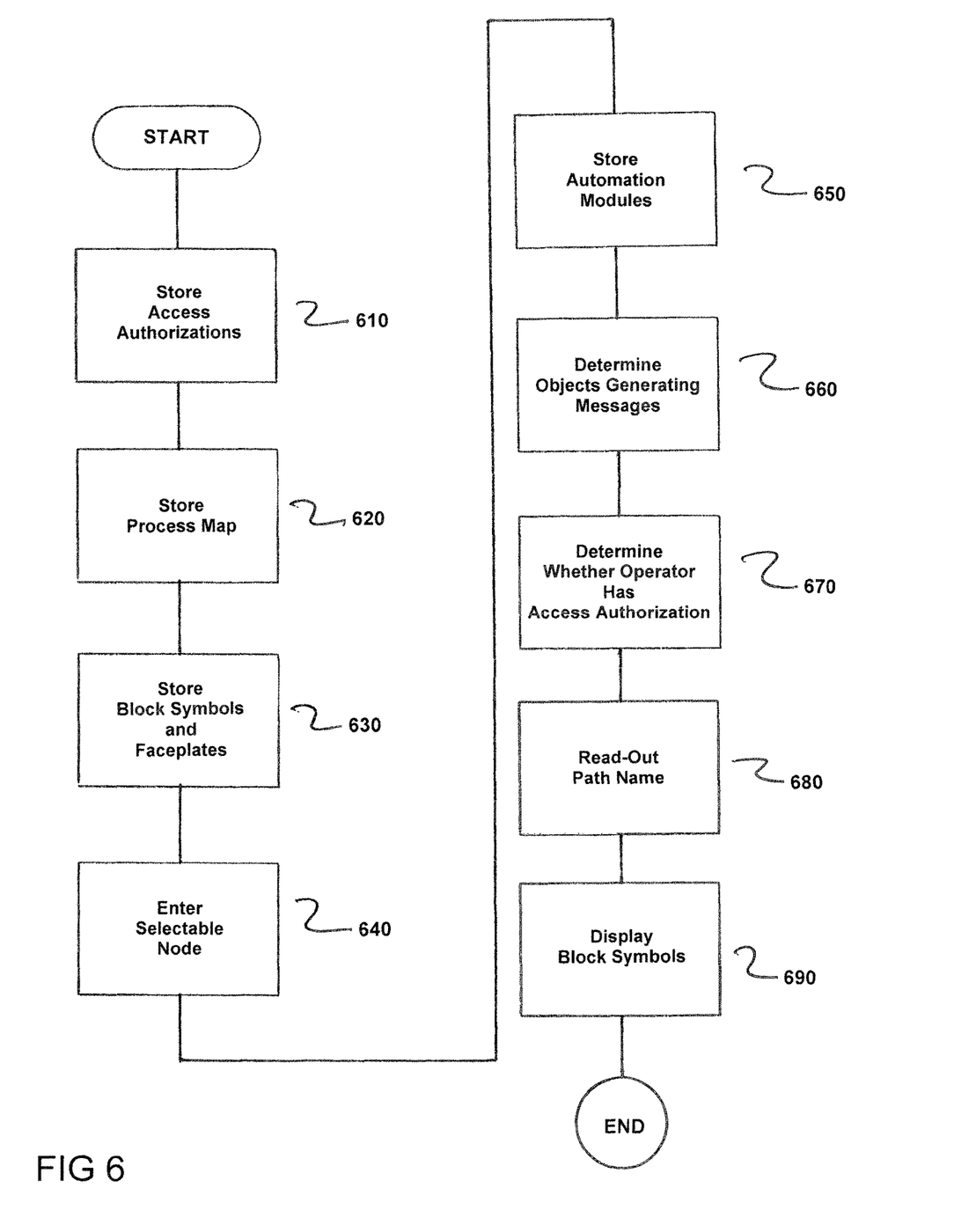
FIG. 6 is a flowchart of the method in accordance with the invention.

FIG. 6 is a flowchart of a method for operating and observing a technical plant to be controlled. The method comprises storing access authorizations in an operator server 2 of an operator system 2, 4, as indicated in step 610. Here, the access authorizations describe to which process objects an operator, which is logged on to the operator system 2, 4, is allowed to have either read and/or write access.

Next, a process map 9 having process map modules 10, 11 belonging to the process objects is stored in the operator server 2, as indicated in step 620.

Next, block symbols 24 to 31, belonging to the process objects, of plant schematics, and faceplates belonging to the process objects, are stored in the operator server 2, 4, as indicated in step 630.

Next, a node 7 that is selectable by an operator is entered in an equipment hierarchy 6 for a respective plant schematic for opening the respective plant schematic for display on an operator client 4 of the operator system 2, 4, as indicated in step 640.

Next, automation modules 12, 13 belonging to the process objects are stored in an automation device 3, as indicated in step 650. In accordance with the invention, the automation modules transmit messages to the operator server 2 at runtime of the automation device 3.

In the event that messages are transmitted to the operator server 2, 4, the method further comprises determining, based on the transmitted messages, which of the process objects are generating messages, as indicated in step 660. A determination is then made, based on the stored access authorizations, whether the operator which is logged on to the operator system 2, 4, is authorized to access that process object generating the message, as indicated in step 670.

Next, a path name 19, 20 describing the path of the process object generating a message in the equipment hierarchy 6 in a respective process map modules 10, 11 is read out, as indicated in step 680.

Next, the block symbols of the process objects generating the message are displayed when the operator that is logged on is authorized to operate the process objects generating the message, and when a message node 21, 22 in the equipment hierarchy 6 is selected by the operator which is logged on, as indicated in step 690.

Thus, while there have been shown, described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A method for operating and observing a technical plant to be controlled, comprising:
  storing access authorizations in an operator server of an operator system, said access authorizations describing to which process objects an operator, which is logged on to the operator system, is allowed to have at least one of (i) read access and (ii) write access;
  storing a process map having process map modules belonging to the process objects in the operator server;
  storing block symbols, belonging to the process objects, of plant schematics, and storing faceplates belonging to the process objects, in the operator server;
  entering a node which is selectable by an operator in an equipment hierarchy for a respective plant schematic for opening the respective plant schematic for display on an operator client of the operator system;
  storing automation modules belonging to the process objects in an automation device, the automation modules transmitting messages to the operator server at runtime of the automation device;
  wherein when messages are transmitted to the operator server, the method further comprising:
    determining, based on the transmitted messages, which of the process objects are generating messages;
    determining, based on the stored access authorizations, whether the operator which is logged on to the operator system, is authorized to access that process object generating the message;
    reading out a path name describing the path of the process object generating a message in the equipment hierarchy in a respective process map modules; and
    displaying the block symbols of the process objects generating the message when the operator which is logged on is authorized to operate the process objects generating the message, and when a message node in the equipment hierarchy is selected by the operator which is logged on.

2. The method as claimed in claim 1, wherein in the event that the displayed block symbol of the respective process objects generating a message is selected by the operator, the faceplate belonging to that block symbol is opened for the purpose of operating the process object; and wherein the faceplate and the block symbol is removed after operation.

3. The method as claimed in claim 2, wherein further symbols which point to removed block symbols are displayed in addition to the displayed block symbols.

4. An operator system for a process control system, comprising:
  an operator system including an operator server in which access authorizations are stored, said access authorizations describing to which process objects an operator which is logged on to the operator system is allowed to have at least one of (i) read access and (ii) write access,
  a process map having process map modules belonging to the process objects being stored in the operator server, and block symbols, belonging to the process objects, of plant schematics and also faceplates belonging to the process objects, being stored in the operator server; and
  a node which is selectable by an operator entered in an equipment hierarchy for a respective plant schematic for opening the respective plant schematic for display on an operator client of the operator system;
  wherein the operator server is configured to receive, from an automation device in which automation modules belonging to the process objects are stored, messages from the automation modules at runtime of the automation device;
  wherein the operator system is configured, in an event that messages are received by the operator server, to:
    determine, based transmitted the messages, which of the respective process objects are generating a message;
    determine, based on the stored access authorizations, whether the operator which is logged on to the operator system is authorized to access that process object generating the message; and
    read out a path name describing the path of the process object generating a message in the equipment hierarchy in the respective process map modules; and
    display the block symbols of the process objects generating the message in the event that the operator which is logged on is authorized to operate the process objects generating the message, and in the event that the operator who is logged on selects a message node in the equipment hierarchy.

5. The operator system as claimed in claim 4, wherein the operator system (2, 4) is further configured, in the event that the displayed block symbol (27, 28) of the respective process objects generating the message is selected by the operator, to open a faceplate belonging to that block symbol (27, 28) for operating the process object and to remove the faceplate and the block symbol (27, 28) after operation.

6. The operator system as claimed in claim 5, wherein the operator system (4) is configured to display further symbols (33) which point to removed block symbols (27, 28) in addition to the displayed block symbols.

* * * * *